(12) United States Patent
Tateishi et al.

(10) Patent No.: US 8,551,213 B2
(45) Date of Patent: Oct. 8, 2013

(54) METHOD OF COAL GASIFICATION AND DIRECT IRONMAKING AND SYSTEM THEREFOR

(75) Inventors: Masataka Tateishi, Kobe (JP); Masahiro Motoyuki, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 194 days.

(21) Appl. No.: 13/120,942

(22) PCT Filed: Sep. 25, 2009

(86) PCT No.: PCT/JP2009/066634
§ 371 (c)(1),
(2), (4) Date: Mar. 25, 2011

(87) PCT Pub. No.: WO2010/035779
PCT Pub. Date: Apr. 1, 2010

(65) Prior Publication Data
US 2011/0197712 A1 Aug. 18, 2011

(30) Foreign Application Priority Data

Sep. 26, 2008 (JP) ................................. 2008-248688

(51) Int. Cl.
*C21B 11/08* (2006.01)
*C10K 3/06* (2006.01)
*C10J 3/00* (2006.01)

(52) U.S. Cl.
USPC ................. 75/505; 75/484; 75/958; 266/155; 266/156; 266/177; 48/99; 48/210

(58) Field of Classification Search
USPC ..................................... 75/505, 958; 266/156
See application file for complete search history.

(56) References Cited

U.S. PATENT DOCUMENTS 6,592,646 B2   7/2003   Shigehisa et al.
6,685,754 B2 * 2/2004   Kindig et al. .................. 48/210

FOREIGN PATENT DOCUMENTS

| JP | 63 192811   | 8/1988 |
| JP | 9-310111    | 12/1997 |
| JP | 9 310111    | 12/1997 |
| JP | 2000 212620 | 8/2000 |
| JP | 2002 146420 | 5/2002 |
| JP | 2005 42142  | 2/2005 |
| JP | 2008 163257 | 7/2008 |
| JP | 2008-163257 | 7/2008 |

OTHER PUBLICATIONS

Yang et al. "A Direct Reduction Process by Shaft Furnace with Gasification of Coal and Enriched Oxygen". Iron and Steel. vol. 30, Issue 5. pp. 9-11 and 26. 1995. Written translation form the USPTO.*

(Continued)

*Primary Examiner* — George Wyszomierski
*Assistant Examiner* — Tima M McGuthry Banks
(74) *Attorney, Agent, or Firm* — Oblon, Spivak, McClelland, Maier & Neustadt, L.L.P.

(57) ABSTRACT

A system of coal gasification and direct ironmaking attains both heat recovery in a coal-based direct ironmaking process and a reduction in equipment investment in a coal gasification process. A waste heat boiler in the system recovers heat of gas exhausted from a coal gasification furnace. A heater in exhaust gas lines of a heat reduction furnace in the coal-based direct ironmaking process superheats the steam generated by and exhausted from the waste heat boiler. A superheated steam line supplies the steam superheated by the heater as an oxidant to the coal gasification furnace.

11 Claims, 3 Drawing Sheets

(56) References Cited

OTHER PUBLICATIONS

Combined Chinese Office Action and Search Report issued Nov. 5, 2012 in Chinese Patent Application No. 200980133992.2 (with English-language translation).
International Search Report issued Nov. 24, 2009 in PCT/JP09/066634 filed Sep. 25, 2009.
Office Action issued Jun. 8, 2012 in Russian Patent Application No. 2011111430 (with English translation).
Korean Office Action issued Aug. 31, 2012, in Korea Patent Application no. 10-2011-7006397 (with English translation).
Chinese Office Action issued Jul. 24, 2013 in corresponding CN Application No. 200980133992.2.
Shouli Yang et al., "A Direct Reduction Process by Shaft Furnace With Gasification of Coal and Enriched Oxygen", Iron and Steel, vol. 30, No. 5, May 1995.
Chinese Office Action issued Jul. 24, 2013 in corresponding CN Application No. 200980133992.2 (with English translation).
Shouli Yang et al., "A Direct Reduction Process by Shaft Furnace With Gasification of Coal and Enriched Oxygen", Iron and Steel, vol. 30, No. 5, May 1995 (with English translation).

\* cited by examiner

METHOD OF COAL GASIFICATION AND DIRECT IRONMAKING AND SYSTEM THEREFOR

TECHNICAL FIELD

The present invention relates to a method of coal gasification and direct ironmaking, and systems therefor. The method is configured by combining a coal gasification process with a coal-based direct ironmaking process. In the coal gasification process, coal and an oxidant are reacted to produce coal gas. In the coal-based direct ironmaking process, carbon composite agglomerates are produced using raw materials including an iron oxide containing substance and coal, and the produced carbon composite agglomerates are heated and reduced in a heat reduction furnace to produce metallized iron.

BACKGROUND ART

The coal gasification process includes heating to pyrolyze a raw material such as coal and recovering product gas as an energy source for power generation or the like. In this coal gasification process, coal serving as the raw material is fed into a gasification furnace, and oxygen containing gas and high-temperature steam, which serve as oxidants, are supplied into the gasification furnace to partially combust the raw material in the gasification furnace, so that generated heat is used to pyrolyze and gasify the remaining uncombusted raw material (see Patent Document 1, for example).

Currently, the coal gasification process described above is mainly used for coal gasification hybrid power generation, which can advantageously utilize coal resources that are widely spread all over the world as well as are reserved adequately. Moreover, the coal gasification hybrid power generation realizes an excellent power generation efficiency, so that suppressed are the amounts of resultant substances such as carbon dioxide, sulfur oxides, and nitrogen oxides per amount of generated power.

Meanwhile, in the coal-based direct ironmaking process, blended raw materials including an iron oxide containing substance and coal serving as a reductant are preliminarily formed into agglomerates such as pellets or briquettes, and the agglomerates are supplied into a rotary hearth furnace. While moving in the rotary hearth furnace, the blended raw materials are heated with heat generated by a heating burner or with product fuel gas, so that the iron oxide in the blended raw materials are reduced by the reductant to obtain metallized iron (reduced iron) (see Patent Document 2, for example).

PRIOR ART DOCUMENTS

Patent Documents

Patent Document 1: Japanese Unexamined Patent Publication No.
Patent Document 2: Japanese Unexamined Patent Publication No. H09-310111

DISCLOSURE OF THE INVENTION

Problems to be Solved by the Invention

In the coal gasification process described above, sensible heat of exhaust gas, which is generated in the process, is used to produce steam. Efficient production of such steam requires a large difference in temperature between a heating medium and a cooling medium in a heat exchanger.

However, it is impossible to heat the steam (heating medium) up to a temperature higher than that of exhaust gas or product gas of a coal gasification furnace. Accordingly, in a case where a desired difference in temperature cannot be achieved in the heat exchanger, the specification of the equipment needs to be modified, that is, the heat transfer area of the heat exchanger needs to be increased. As a result, there arises a problem of increase in initial investment cost for the equipment. If the specification of the equipment cannot be modified, the amount of heat exchange is decreased and the process does not work properly.

Moreover, the gas especially produced in the coal gasification furnace includes tar, which may cause a serious trouble if it is deposited in the heat exchanger. In order to avoid such a trouble, the product gas is once cooled to remove tar, which results in difficulty in recovering the sensible heat of the product gas.

Therefore, the sensible heat of the product gas has not been effectively utilized in the coal gasification process, and the amount of heat recovery was poor, so that the steam could not be heated to a high temperature.

Meanwhile, in the coal-based direct ironmaking process, even in a case where waste heat is recovered through steam, the steam is not used in the same system. Thus, such steam is utilized for power generation with use of a steam turbine, for example. However, the steam is not effectively utilized in the same process.

The present invention was made in consideration of the above problems of the coal gasification process and the coal-based direct ironmaking process which are conventionally adopted. The present invention provides a coal gasification and direct ironmaking method as well as systems therefor, which raise the temperature of the steam produced in the coal gasification process with use of the waste heat generated in the coal-based direct ironmaking process, and supply the superheated steam as an oxidant for the coal gasification process to speed up the coal gasification. By applying the present invention, the coal gasification process can be compacted, the investment cost for the equipment to be used in the coal gasification process can be reduced, and further, heat can be effectively utilized in the respective processes so as to increase the amount of waste heat recovery in the direct ironmaking process.

Solutions to the Problems a. Method of Coal Gasification and Direct Ironmaking A method of coal gasification and direct ironmaking, according to the present invention is characterized by including: recovering heat of exhaust gas exhausted in a coal gasification process by a waste heat boiler in the process; guiding steam produced and exhausted by the waste heat boiler to a heater provided in an exhaust gas path in a coal-based direct ironmaking process so as to superheat the steam therein; and supplying the resultant superheated steam as an oxidant to a coal gasification furnace in the coal gasification process (coal gasification system).

The method of coal gasification and direct ironmaking, according to the present invention is characterized in that gas produced in the coal gasification process is supplied as fuel to a heat reduction furnace in the coal-based direct ironmaking process (coal gasification system).

Another method of coal gasification and direct ironmaking, according to the present invention is characterized by including: recovering heat of exhaust gas exhausted in a coal-based direct ironmaking process by a waste heat boiler in the process; guiding steam produced and exhausted by the waste heat boiler to a heater provided in an exhaust gas path in the coal-based direct ironmaking process so as to superheat the steam therein; and supplying the resultant superheated steam as an oxidant to a coal gasification furnace in a coal gasification process.

Unlike an indirect ironmaking method for producing pig iron in a shaft furnace such as the blast furnace method, the present direct ironmaking method means ironmaking method for producing iron such as reduced iron or metal particles by heating with use of combustion heat of a burner and product fuel gas using a rotary hearth furnace, a kiln, or the like. The expression "coal-based" indicates that raw materials include coal serving as a reductant. Alternatively, the raw materials may include fixed carbon, such as a scrap tire.

The direct ironmaking process in the present invention includes the following two production processes: namely, (a) a production process feeding carbon composite agglomerates into a rotary hearth furnace to heat and reduce the same, and discharging resultant reduced iron from the furnace, and (b) a production process feeding carbon composite agglomerates into the rotary hearth furnace to heat, reduce, and melt the same so as to be separated into iron and slag, aggregating the molten iron into particles in the furnace, and cooling to discharge the particles.

In the method of coal gasification and direct ironmaking, according to the present invention, the temperature of the exhaust gas exhausted or a product gas produced by the coal gasification furnace is preferably lower than that of the gas exhausted in the coal-based direct ironmaking process.

In the method of coal gasification and direct ironmaking, according to the present invention, it is possible to supply to the coal gasification furnace, as an oxidant, superheated steam at a temperature and a flow rate which cannot be achieved only in the coal gasification process, thereby realizing reduction in size of the coal gasification furnace.

Meanwhile, in the coal-based direct ironmaking process, it is possible to effectively utilize the waste heat generated by the heat reduction furnace, which has not been effectively utilized or has been utilized at a poor rate.

b. Coal Gasification and Direct Ironmaking Systems

A coal gasification and direct ironmaking system according to the present invention is characterized by including: a waste heat boiler for recovering heat of gas exhausted from a coal gasification furnace; a heater provided in an exhaust gas path of a heat reduction furnace in a coal-based direct ironmaking process to superheat steam produced and exhausted by the waste heat boiler; and a superheated steam line for supplying to the coal gasification furnace the steam superheated by the heater as an oxidant.

Another coal gasification and direct ironmaking system according to the present invention is characterized by including: a waste heat boiler for recovering, within a coal-based direct ironmaking process, heat of exhaust gas exhausted in the process; a heater provided in an exhaust gas path of a heat reduction furnace in the coal-based direct ironmaking process to superheat steam produced and exhausted by the waste heat boiler; and a superheated steam line for supplying to a coal gasification furnace the steam superheated by the heater as an oxidant.

With use of the coal gasification and direct ironmaking systems according to the present invention, it is possible to reduce size of the coal gasification furnace in comparison to a system inclusive only of a coal gasification furnace, as well as to increase the amount of heat generated by the product gas per unit area. Further, in the coal-based direct ironmaking system, increase in amount of heat generated by the product gas realizes reduction in amount of the product gas consumed. As a result, it is possible to reduce the amount of $CO_2$ generated in the system and thereby to contribute to energy saving.

Moreover, it is possible to increase the amount of waste heat recovered in these systems, so that improved is the efficiency of waste heat used in these systems.

In the coal gasification and direct ironmaking systems according to the present invention, the heat reduction furnace may be configured by a rotary hearth furnace that heats and reduces carbon composite agglomerates including an iron oxide containing substance and a coal-based reductant.

In the coal gasification and direct ironmaking systems according to the present invention, the heater may be configured by a superheater that guides steam exhausted from a steam drum of the waste heat boiler into a fire tube and guides gas exhausted from the heat reduction furnace into a case accommodating the fire tube to superheat the steam in the fire tube.

The coal gasification and direct ironmaking systems according to the present invention may further include: a steam connection line for connecting a steam drum of the waste heat boiler in the coal-based direct ironmaking process or in the coal gasification process and an inlet port of the heater.

In a case where the coal gasification and direct ironmaking systems according to the present invention further includes a gasholder for reserving product gas produced by the coal gasification furnace, the systems can be configured such that the product gas is supplied from the gasholder to a fuel supply port of the heat reduction furnace.

Effects of the Invention

According to the present invention, it is possible to further heat the steam produced in the coal gasification process with use of the waste heat generated in the coal-based direct ironmaking process, and to supply such superheated steam to the coal gasification process, thereby achieving increase in speed of the coal gasification. As a result, increased is the amount of heat recovered in the coal-based direct ironmaking process, while decreased is the investment cost for the equipment used in the coal gasification process, thereby achieving increase in amount of heat generated by the product gas per unit volume.

Moreover, in the coal-based direct ironmaking process, increase in amount of heat generated by the product gas achieves reduction in specific energy consumption, and it is therefore possible to save the impact on the environment.

Furthermore, it is possible to improve the waste heat recovery rate as well as the waste heat utilization rate in these processes.

BEST MODES FOR CARRYING OUT THE INVENTION

Figure 1:
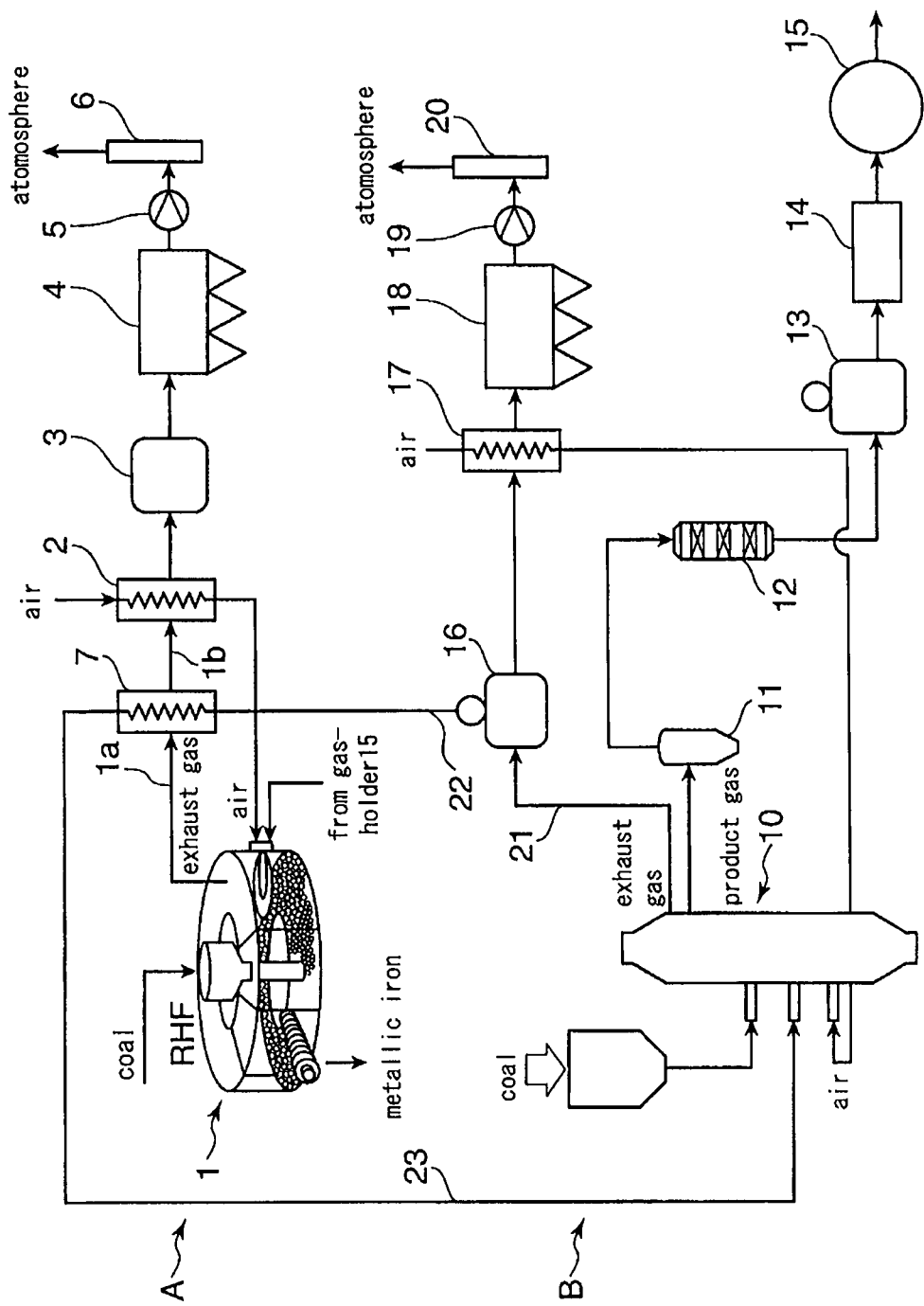
FIG. 1 is a configuration diagram showing coal gasification and direct ironmaking system according to a first embodiment of the present invention.

The present invention is described in detail below in accordance with embodiments shown in the drawings.

FIG. 1 is a configuration diagram showing coal gasification and direct ironmaking system according to a first embodiment of the present invention.

In this figure, the coal gasification and direct ironmaking system is configured by the combination of a system A for performing a coal-based direct ironmaking process and a system B for performing a coal gasification process.

1. System for Performing Coal-Based Direct Ironmaking Process

An iron oxide containing substance and coal (a reductant) are preliminarily blended together and are formed into agglomerates such as pellets or briquettes.

In the system A, the agglomerates are charged into a rotary hearth furnace (heat reduction furnace) 1, spread to form one or two layers on the rotary hearth furnace 1, and heated up to 1250 to 1400° C. in the rotary hearth furnace 1. As a result iron oxide in the iron oxide containing substance is reduced by the coal and converts metallized iron (reduced iron or metal particles) to be discharged from the rotary hearth furnace 1.

CO generated from the agglomerates in the rotary hearth furnace 1 are burnt in the rotary hearth furnace 1 to be used as a main heat source. Fuel gas supplementary fed into the rotary hearth furnace 1 may be LNG, LPG, COG, heavy oil, product gas, or the like.

Exhaust gas generated during the reduction process is supplied from the rotary hearth furnace 1 to a heat exchanger 2 by way of exhaust gas paths 1a and 1b, and is then supplied to a cooler 3 or the like, in which the exhaust gas is cooled. This cooler 3 may be replaced with a boiler unit, or may be combined with such a boiler unit.

In the heat exchanger 2 mentioned above, heat is exchanged between the exhaust gas and air so as to cool the exhaust gas. The heated air is used for combustion or the like in the rotary hearth furnace 1.

The exhaust gas sent out from the cooler 3 is then supplied to a dust remover 4 in which dust in the exhaust gas is removed, and the exhaust gas thus processed is released to atmosphere from a funnel 6 by way of a fan 5.

Superheater 7 is provided between the rotary hearth furnace 1 and the heat exchanger 2 a as a heater for superheating steam.

The superheater 7 guides into a fire tube, steam exhausted from a steam drum of a waste heat boiler unit 16 which is to be described later. Gas exhausted from the rotary hearth furnace 1 is guided into a case accommodating the fire tube, so as to superheat the steam flowing in the fire tube.

The operations of the superheater 7 will be explained in association with the system B described next.

2. System for Performing Coal Gasification Process

In the system B, fuel coal (pulverized coal) is supplied into a coal gasification furnace 10, in which the coal is partially oxidized and gasified by an oxidant such as air, oxygen, or steam.

Product gas at approximately 1000° C. which is produced in the coal gasification furnace 10, is sent by way of a dust removal device 11 to a desulfurization device 12 functioning as a gas purification unit, and waste heat generated from the product gas is recovered in a waste heat boiler unit 13.

The product gas is subsequently supplied to a cooler 14 and is cooled by heat exchanging with air so as to be reserved in a gasholder 15.

The product gas (such as CO or $H_2$) reserved in the gasholder 15 is to be supplied to the rotary hearth furnace 1 as fuel gas.

Meanwhile, exhaust gas at approximately 1100° C. which is exhausted from the coal gasification furnace 10, is supplied to the second waste heat boiler unit 16. The gas exhausted from the second waste heat boiler unit 16 is further supplied to a heat exchanger 17, and cooled by heat exchanging with air. The air heated by the heat exchange is used as combustion air or an oxidant of the coal gasification furnace 10.

The second waste heat boiler unit 16 functions as a waste heat boiler that recovers heat of the exhaust gas exhausted from the coal gasification furnace 10.

The exhaust gas sent out from the heat exchanger 17 is subsequently supplied to a dust remover 18 in which dust in the exhaust gas is removed, and the exhaust gas thus processed is released from funnel 20 into atmosphere by way of a fan 19.

3. Configuration for Cooperatively Operating System A and System B

Figure 2:
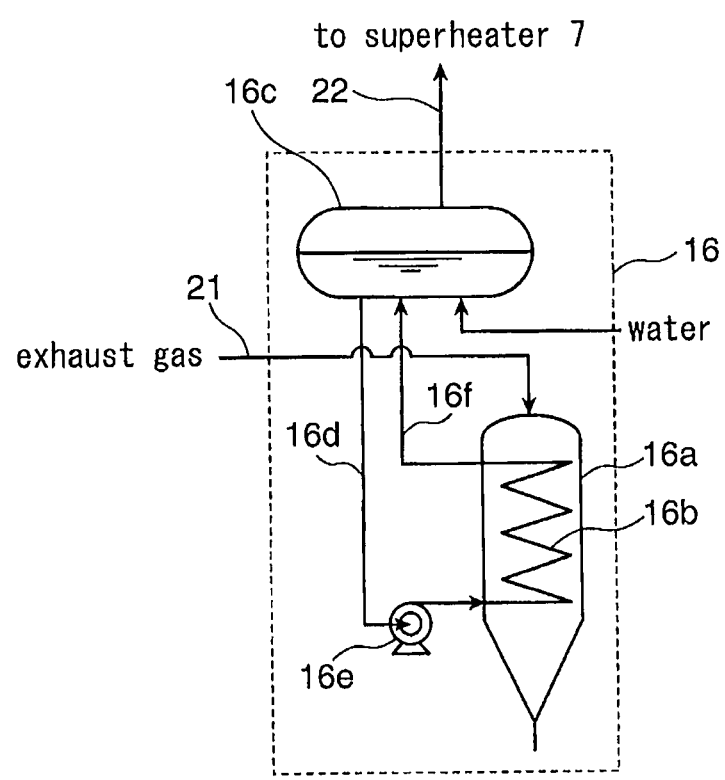
FIG. 2 is an enlarged view of a second waste heat boiler unit illustrated in FIG. 1.

FIG. 2 is an enlarged view of the second waste heat boiler unit 16.

In this figure, the coal gasification furnace 10 (see FIG. 1) is connected to a waste heat recovery boiler 16a of the second waste heat boiler unit 16 by way of an exhaust gas line 21.

In the waste heat recovery boiler 16a, a heat transfer tube 16b is placed in a serpentine shape, so that water is supplied from a steam drum 16c to an inlet port of the heat transfer tube 16b by way of a circulation line 16d and a circulation pump 16e.

When water is supplied from the steam drum 16c into the heat transfer tube 16b and is vaporized therein, resultant steam is returned to the steam drum 16c by way of a steam line 16f.

Gas and liquid are separated from each other in the steam drum 16c, and steam thus obtained is supplied to the superheater 7 (see FIG. 1) described above by way of a steam connection line 22.

The steam connection line 22 is provided to connect the steam drum 16c and an inlet port of the fire tube of the superheater 7 (the inlet port of the heater).

As described earlier, the superheater 7 superheats the steam, and the steam superheated to 600° C. is supplied as an oxidant to the coal gasification furnace 10 by way of a superheated steam line 23 (see FIG. 1). Also as described above, the product gas produced in the coal gasification furnace 10 and reserved in the gasholder 15 is supplied to the rotary hearth furnace 1 as fuel gas. In this configuration, these two systems operate cooperatively with each other.

The conventional direct ironmaking process does not use steam in the same system. Therefore, even in a case where the sensible heat of the exhaust gas is recovered through the steam, such sensible heat cannot be effectively utilized. Although this sensible heat may be applied to power generation with use of a steam turbine, such power generation will exert only small economical advantages in view of the power generation efficiency with use of such a steam turbine.

To the contrary, the present invention is configured such that the steam obtained in the coal gasification process is superheated with use of the high temperature exhaust gas generated in the direct ironmaking process so as to be supplied to the coal gasification furnace. Therefore, the speed of the coal gasification is increased in the coal gasification process, and the coal gasification furnace can be reduced in size, which results in reduction in investment cost for the equipment.

Moreover, it is possible to reduce the amount of steam to be used in the coal gasification, which increases the amount (per unit volume) of heat generated by the product gas. As a result, it is possible to reduce the amount of the product gas to be consumed in the direct ironmaking process.

Also achieved are improvement in waste heat recovery rate in the respective systems as well as improvement in waste heat utilization rate in the systems.

Figure 3:
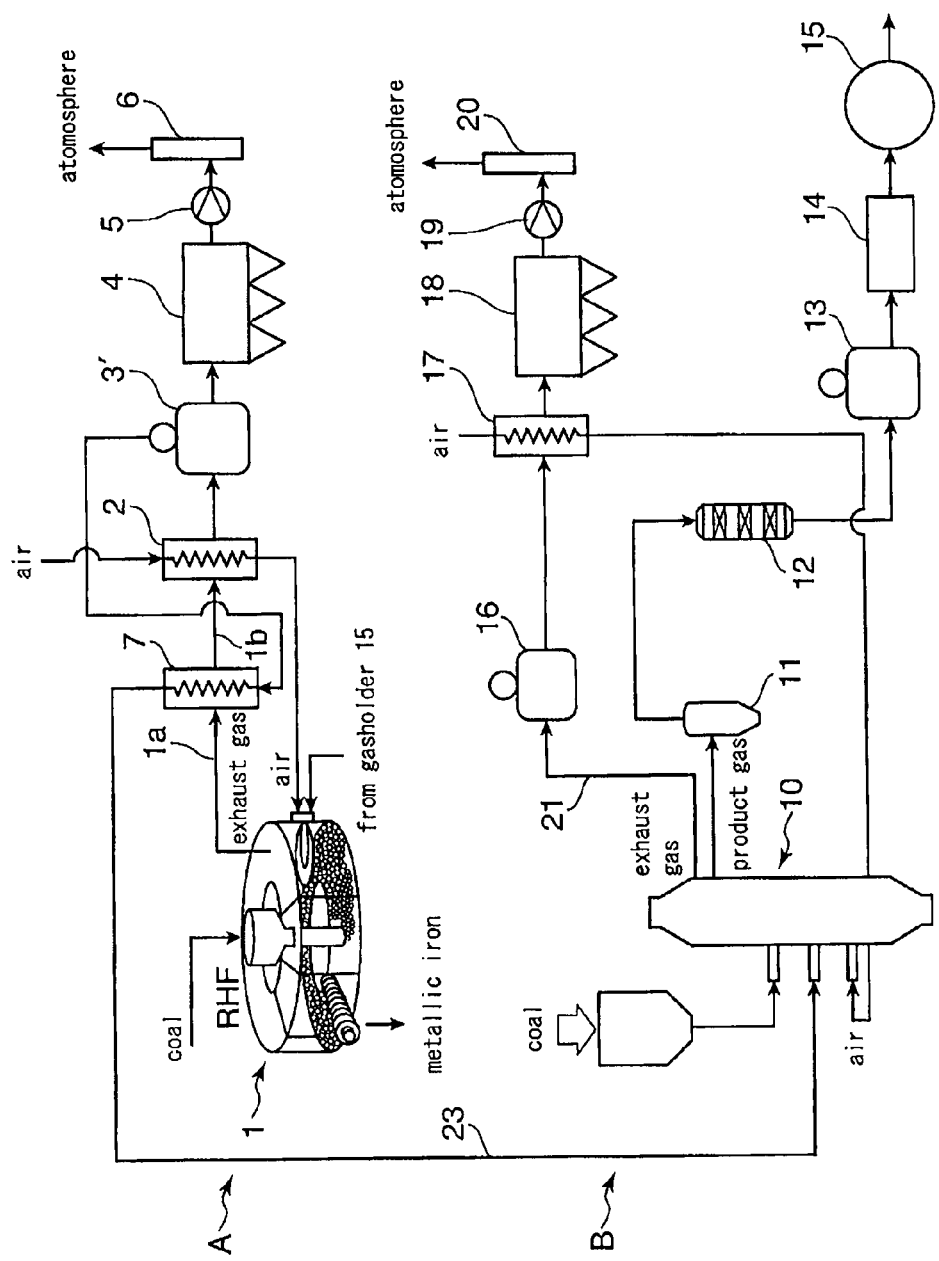
FIG. 3 is a configuration diagram showing coal gasification and direct ironmaking system according to a second embodiment of the present invention.

FIG. 3 is a configuration diagram showing coal gasification and direct ironmaking system according to a second embodiment of the present invention.

In this figure, components same as those of FIG. 1 are denoted by same symbols, and description thereof will not be repeated.

The production systems shown in FIG. 3 differ from those shown in FIG. 1 in the configuration of a path for supplying steam to the coal gasification furnace.

The system A is provided on the downstream of the heat exchanger 2 with a waste heat boiler 3', which will recover heat of exhaust gas generated in the coal-based direct ironmaking process with the use of steam.

The steam obtained by the waste heat boiler 3' is guided to the superheater 7 to be superheated. This superheated steam is supplied as an oxidant to the coal gasification furnace 10 by way of the superheated steam line 23.

In the production systems shown in FIG. 3, the exhaust gas exhausted from the rotary hearth furnace 1 does not include tar, unlike the exhaust gas exhausted from the coal gasification furnace 10. Accordingly, the exhaust gas from the rotary hearth furnace 1 can be supplied, with no necessity for removal of tar, to the waste heat boiler 3', recovered as steam, and supplied to the coal gasification furnace 10 as a gasifying agent advantageously.

In general, oxygen or air is mainly used as the gasifying agent to be supplied to the coal gasification furnace. Adoption of pure oxygen rather than air will further improve the efficiency of the gasification. In this regard, there is a system including an oxygen generator and a coal gasification furnace. However, in such a case where the oxygen generator is provided, there needs power to be supplied to this oxygen generator. In other words, the power generated by the turbine in the coal gasification power generation system is partially consumed by the oxygen generator. As a result, the energy conversion efficiency is not necessarily high in the entire system provided with the oxygen generator.

To the contrary, the present invention adopts, as a gasifying agent, steam that can be readily obtained as well as can be handled easily. The steam, which can be obtained in the coal gasification process but is hard to be heated, is superheated with use of the high temperature exhaust gas which is obtained in the direct ironmaking process. Alternatively, the steam obtained in the direct ironmaking process is superheated within the same system, and the resultant superheated steam is supplied to the coal gasification furnace. Therefore, the present invention realizes the systems of high energy conversion efficiency with no need to provide an oxygen generator.

The preferred embodiments of the present invention have been sufficiently described with reference to the accompanying drawings. However, it could be made by a person skilled in this technical field to implement the present invention with application of many variations and modifications thereto. Such variations and modifications should be regarded as being included in the technical scope of the present invention as long as not departing from the scope of ideas for solving the problems of the present invention.

INDUSTRIAL APPLICABILITY

The present invention is applicable to a coal gasification process for coal gasification hybrid power generation or the like, as well as to a coal-based direct ironmaking process of producing reduced iron or metal particles with use of a rotary hearth furnace or a kiln.

DESCRIPTION OF SYMBOLS 1 rotary hearth furnace (heat reduction furnace)
1a, 1b exhaust gas path
2 heat exchanger
3 cooler
4 dust remover
5 fan
6 funnel
7 superheater (heater)
10 coal gasification furnace
11 dust removal device
12 desulfurization device
13 waste heat boiler unit
14 cooler
15 gasholder
16 second waste heat boiler unit (waste heat boiler)
16a waste heat recovery boiler
16b heat transfer tube
16c steam drum
16d circulation line
16e circulation pump
16f steam line
17 heat exchanger
18 dust remover
19 fan
20 funnel
21 exhaust gas line
22 steam connection line
23 superheated steam line

The invention claimed is:

1. A method of coal gasification and direct ironmaking, the method comprising:
    recovering heat of an exhaust gas exhausted in a coal gasification process by a waste heat boiler in the coal gasification process;
    guiding steam produced and exhausted by the waste heat boiler to a heater in an exhaust gas path in a coal-based direct ironmaking process, thereby obtaining a superheated steam; and
    supplying the superheated steam as an oxidant to a coal gasification furnace in the coal gasification process.

2. The method according to claim 1, further comprising:
    supplying a product gas produced in the coal gasification process as fuel to a heat reduction furnace in the coal-based direct ironmaking process.

3. A method of coal gasification and direct ironmaking, the method comprising:
    recovering heat of an exhaust gas exhausted in a coal-based direct ironmaking process by a waste heat boiler in the coal-based direct ironmaking process;
    guiding steam produced and exhausted by the waste heat boiler to a heater in an exhaust gas path in the coal-based direct ironmaking process, thereby obtaining a superheated steam; and
    supplying the superheated steam as an oxidant to a coal gasification furnace in a coal gasification process.

4. A coal gasification and direct ironmaking system, comprising:
    a waste heat boiler suitable for recovering heat of gas exhausted from a coal gasification furnace;

a heater in an exhaust gas path of a heat reduction furnace in a coal-based direct ironmaking process suitable for superheating steam produced and exhausted by the waste heat boiler; and a superheated steam line suitable for supplying the steam superheated by the heater as an oxidant to the coal gasification furnace.

5. A coal gasification and direct ironmaking system, comprising:

a waste heat boiler suitable for recovering, within a coal-based direct ironmaking process, heat of an exhaust gas exhausted in the coal-based direct ironmaking process;

a heater in an exhaust gas path of a heat reduction furnace in the coal-based direct ironmaking process suitable for superheating steam produced and exhausted by the waste heat boiler; and a superheated steam line suitable for supplying the steam superheated by the heater as an oxidant to a coal gasification furnace.

6. The system according to claim 4 or 5, wherein the heat reduction furnace comprises a rotary hearth furnace that is suitable for heating and reducing a carbon composite agglomerate, wherein the agglomerate comprises a substance comprising iron oxide, and wherein the agglomerate further comprises coal as a reductant.

7. The system of claim 6, wherein the rotary hearth is configured to heat the agglomerate to a temperature of from 1250 to 1400° C.

8. The system of claim 6, further comprising:

a heat exchanger configured to receive exhaust gas from the rotary hearth furnace, and a cooler configured to cool the exhaust gas.

9. The system according to claim 4 or 5, wherein the heater comprises a superheater configured to guide steam exhausted from a steam drum of the waste heat boiler into a fire tube and wherein the superheater is further configured to guide an exhaust gas from the heat reduction furnace into a case comprising the fire tube, thereby superheating steam in the fire tube.

10. The system according to claim 4 or 5, further comprising:

a steam connection line suitable for connecting a steam drum and an inlet port of the heater wherein the steam drum is a steam drum of the waste heat boiler.

11. The system according to claim 4 or 5, further comprising:

a gasholder suitable for reserving a product gas produced by the coal gasification furnace, wherein the system is capable of supplying the product gas from the gasholder to a fuel supply port of the heat reduction furnace.

\* \* \* \* \*